Feb. 23, 1932. H. F. WEBB 1,846,168
FILTER
Filed Aug. 10, 1929 2 Sheets-Sheet 1

Henry F. Webb INVENTOR.
BY Liddle, Mangean and Horridge
ATTORNEYS.

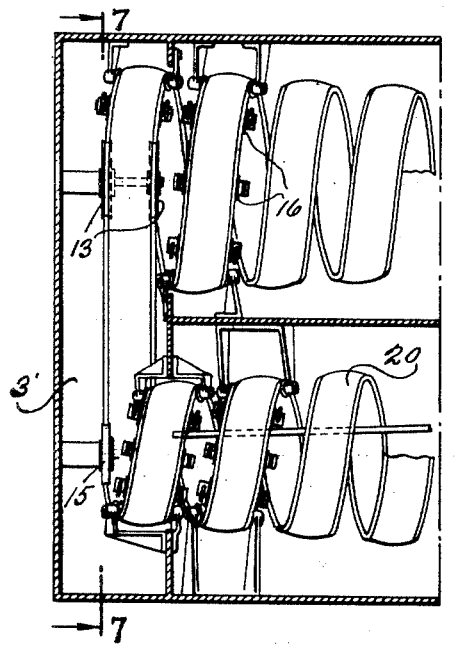
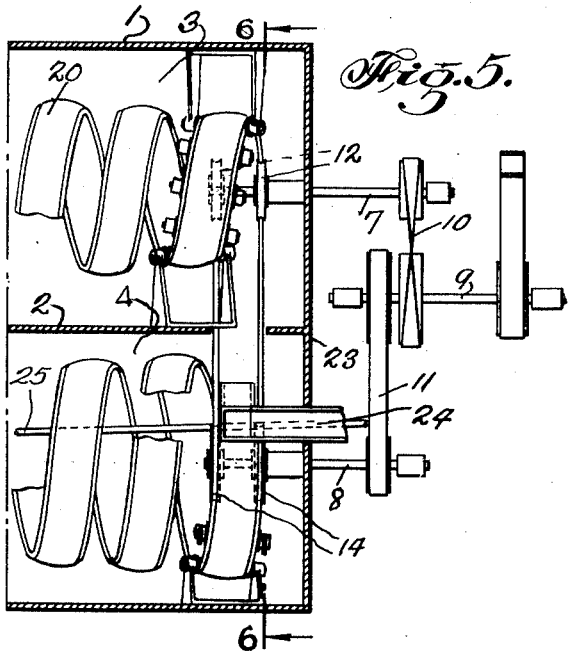
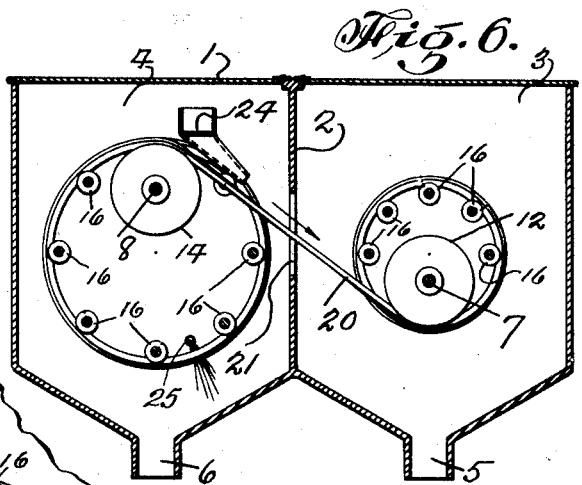
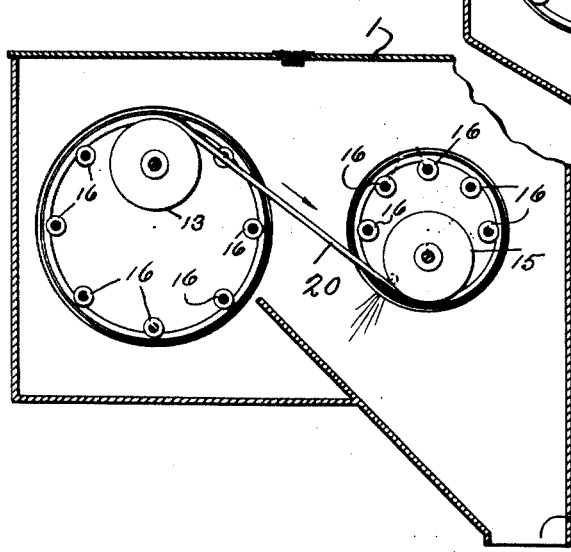

Patented Feb. 23, 1932

1,846,168

UNITED STATES PATENT OFFICE

HENRY F. WEBB, OF SALT LAKE CITY, UTAH, ASSIGNOR TO THE MINE AND SMELTER SUPPLY COMPANY, OF DENVER, COLORADO, A CORPORATION OF COLORADO

FILTER

Application filed August 10, 1929. Serial No. 385,027.

This invention relates to an improvement in filters for use in mining, milling, metallurgical, chemical, sugar and other industries, the apparatus being adapted for separating liquids from solid or partial solid substances and for the washing of solid or partial solid materials, the expression "filter" being employed in its generic sense and to include the washing of materials as well as the separating of liquids from solids.

In general the invention comprises a construction employing a driven endless conveyor which is so supported and arranged as to move in two progressively rotative paths, reversed with respect to each other, these paths being helical, and the belt being driven at a sufficient speed to force the liquid therethrough by centrifugal force.

The feed may consist of a mixed liquid and solid or partial solid and can be fed continuously or intermittently, as desired, to the conveyor, the centrifugal force developed causing the liquid in the mixture to be forced through the conveyor, the filter cake discharging automatically when the conveyor is inverted for reverse direction of travel.

Inasmuch as after the conveyor is reversed in direction of travel any filter cake clinging thereto is on the outside of the belt, it will be obvious that before any given point on the belt has returned to the starting point the belt will be freed of this material.

If desired, however, a washing liquid may be introduced on the inside of the conveyor at any convenient point desired during the return travel as distinguished from the filtering travel of the conveyor, this liquid being forced through the conveyor by centrifugal force, insuring thorough removal of the filter cake not only from the face of the conveyor but from the interstices of the conveyor as well.

Inasmuch as the conveyor is continuous and its travel continuous, the feeding, filtering, discharging and washing, if washing be employed, may be made continuous if desired.

While the drawings accompanying this application show the conveyor as a filter belt confined to two progressively rotative paths, it is to be understood that the number of paths may be varied if desired. It is to be understood also that the reversed paths may be in line if desired instead of parallel as shown, and that the conveyor may take forms other than the filter belt shown.

When my apparatus is used for washing a solid or partially solid material, the material is fed on the belt in the same manner as above pointed out, either dry or wet. The washing liquid may then be introduced on the inside of the first section of the conveyor in much the same manner that the washing liquid is applied to clean the conveyor, as above explained.

In the drawings:

Fig. 5 is a plan view similar to Fig. 1 of a modification;

Fig. 6 is a section on the line 6—6 of Fig. 5; and

Fig. 7 is a section on the line 7—7 of Fig. 5.

Figure 1:
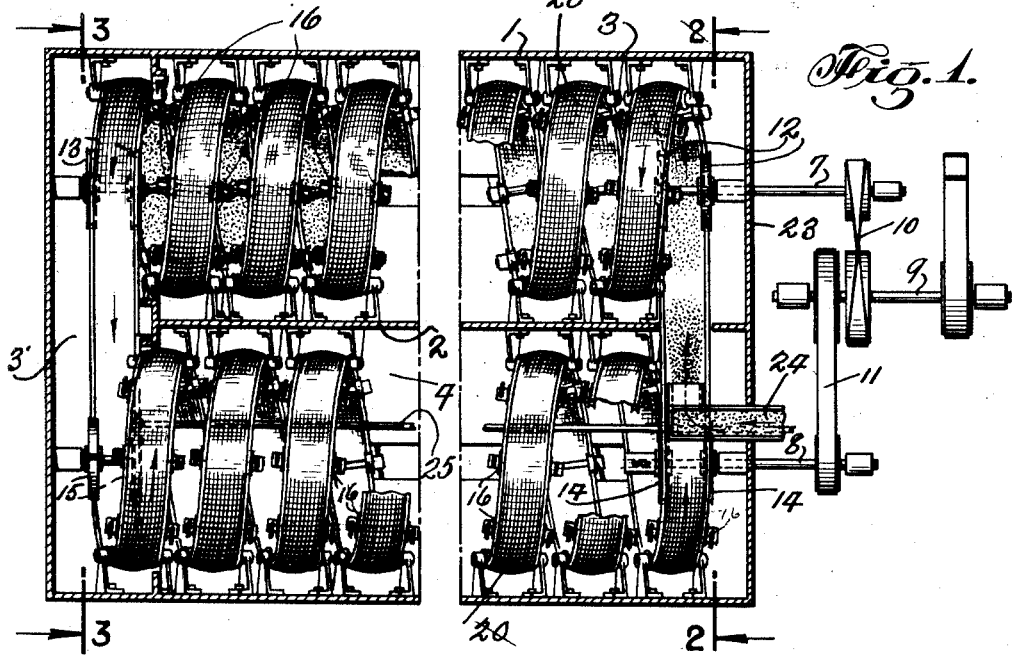
Fig. 1 is a plan view of an embodiment of my invention.

Referring to the drawings in detail and first of all to the embodiment of the invention shown in Figs. 1 to 4, inclusive, it will be seen that my improved apparatus comprises a tank substantially rectangular in form designated 1.

The tank is divided longitudinally by a partition 2 into a filter compartment 3 and conveyor cleaning compartment 4, and by a transverse partition into a filter cake compartment 3'.

The bottom of compartment 3 is sloping and provided with filter discharge 5. The filter cake compartment 3' is provided with discharge outlet 6' and the conveyor cleaning compartment is provided with discharge outlet 6. When filtering valuable mineral concentrates, for example, the cleaning water discharged through outlet 6 will be settled and the material returned to the machine for re-filtering.

7 designates a drive shaft extending into the feed end of filter compartment 3, while 8 designates a drive shaft extending into the cleaning compartment 4 adjacent the feed end of the machine. These shafts are disposed parallel to each other. 9 designates a drive shaft, coupled to shaft 7 by crossed belt 10 and with shaft 8 by straight belt 11. This effects a drive of shafts 7 and 8 in opposite directions. It will be understood that any other suitable form of driving mechanism may be substituted if desired.

The shaft 7 carries a pair of driving sheaves 12, while the shaft 8 carries a pair of similar driving sheaves 14.

The sheaves 12 on shaft 7 rotates in one direction while sheaves 14 on shaft 8 rotate in the opposite direction as will be apparent.

At the other end of the machine are two pairs of sheaves, one designated 13 and the other 15. These are idler sheaves as will be apparent from the description to follow.

Intermediate the sheaves 12 and 13 and intermediate the sheaves 14 and 15 are a plurality of suitably supported idler sheaves 16.

20 designates an endless conveyor for the material to be treated. This conveyor for descriptive purposes is shown in the form of a filter belt or screen. The conveyor is supported on the sheaves above referred to and driven by the driving sheaves 12 and 14.

The sheaves are all so arranged and disposed that the conveyor is supported and driven in a progressively rotative path in one direction throughout part of its travel, and in a similar path but in the reverse direction throughout another part of its travel.

It will be apparent that the conveyor is inverted when reversed in direction of travel and that the snap action or slap produced by this reversal effects discharge of the filter cake from the face of the conveyor into the filter cake compartment 3'.

Figures 2, 3, 4:
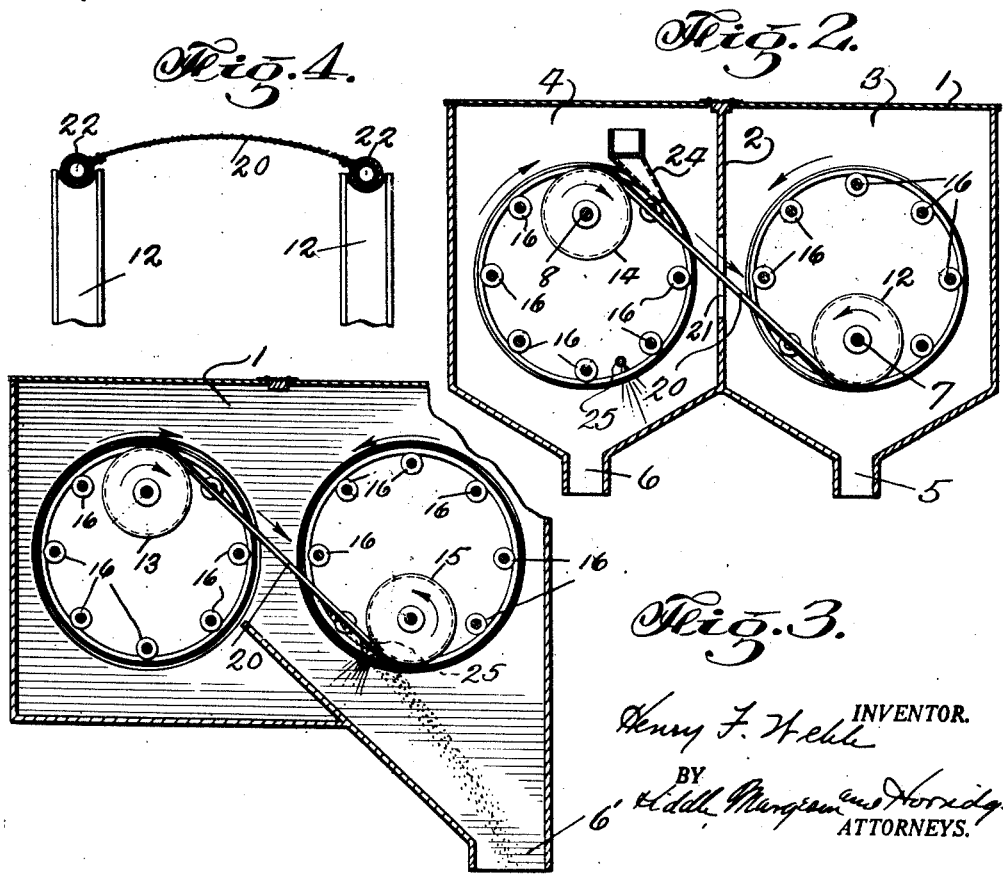
Fig. 2 is a section on the line 2—2 of Fig. 1.
Fig. 3 is a section on the line 3—3 of Fig. 1.
Fig. 4 is a detail somewhat enlarged of the conveyor structure.

The partition 2 is provided, as indicated in Fig. 2, with an opening 21 for the conveyor 20 to pass through.

The construction of one form of conveyor suitable for my purpose is illustrated in some detail in Fig. 4, from which it will be seen that each edge of the belt is beaded as shown at 22 and received by the supporting and driving sheaves. The beading may be of rubber which will resist wear and also give the necessary traction between the belt and the sheaves to insure movement of the belt.

Above the starting end of the belt, that is, adjacent the end wall 23 of the tank I provide a trough 24 through which the material to be treated is fed to the face of the conveyor.

It will be seen from the foregoing that my arrangement provides a tank or container in which a conveyor for the material is supported in such a manner as to travel in reverse progressively rotative paths, the material being treated, during the first part of its travel, being carried along the inside of the conveyor and filtered, the filtering liquid discharging into compartment 3, the filter cake being thrown from the conveyor into compartment 3' where the conveyor reverses.

25 designates a spray pipe in the conveyor cleaning compartment through which water may be fed to the inside of the conveyor on the return side thereof for washing from the conveyor any material which has failed to leave the face of the same and also to free the conveyor of any solids which might have worked thereinto. As above mentioned when treating valuable concentrates, this liquid can then be settled and the material returned to the machine for refiltering.

In the form of my invention shown in Figs. 5, 6 and 7 I have shown a construction similar to that just described and corresponding parts have been given corresponding reference characters. In this embodiment of my invention, however, the supporting sheaves or rollers are so disposed as to support and effect travel of the conveyor in a helix the diameter of this helix progressively increasing instead of the same diameter being maintained throughout as in the first form described.

The above description relates primarily to a filtering process, but when it is desired to wash solid or partially solid materials, as distinguished from filtering, the washing could be done in compartment 3, a spray pipe being introduced into this compartment similar to the pipe 25 in the conveyor cleaning compartment.

It is to be understood that changes may be made in the details of construction above described within the purview of my invention. For example, it may be desirable to substitute the driving and supporting sheaves above referred to with sprockets, the conveyor being changed accordingly.

What I claim is:—

1. Filtering apparatus comprising in combination a horizontally disposed filter conveyor, and a plurality of supports disposed at the opposed edges of the conveyor for supporting and driving the same in a helix.

2. Filtering apparatus comprising in combination a horizontally disposed filter conveyor, and a plurality of supports disposed at the opposed edges of the conveyor and so arranged as to support and drive the conveyor in a helix in one direction throughout a portion of the travel of the conveyor, and in the reverse direction throughout another portion of its travel.

3. Filtering apparatus comprising in combination a filter conveyor belt, supporting sheaves or rollers, and driving sheaves or rollers engaging the opposite sides of the conveyor and so disposed as to support and to drive the conveyor in a helix about a horizontal axis.

4. Filtering apparatus comprising in combination a filter belt, a bead along each side of the belt extending longitudinally of the belt throughout its length, and a plurality of grooved rollers receiving said beaded edges of the belt and so arranged as to support and to drive the belt in a helix about a horizontal axis.

5. Filtering apparatus comprising in combination a filter conveyor, sheave rollers for supporting the same, a pair of parallel drive shafts, means for driving said shafts in opposite directions, driving sheaves carried by said shafts, said supporting sheaves and driving sheaves being arranged to support and drive the conveyor in a progressively rotative path in one direction throughout part of its travel and in a similar path but in the reverse direction throughout another part of its travel, the driving sheaves on one drive shaft engaging the underside of the conveyor and driving sheaves on the other drive shaft engaging the belt on its upper face.

This specification signed this 30 day of July, 1929.

HENRY F. WEBB.